Aug. 9, 1960 W. J. TROYER 2,948,129
ELLIPTICAL VIBRATION DAMPER
Filed June 23, 1958 2 Sheets-Sheet 1

INVENTOR.
WILLIAM J. TROYER.
BY
Lockwood, Galt, Woodard & Smith
ATTORNEYS.

Aug. 9, 1960

W. J. TROYER 2,948,129

ELLIPTICAL VIBRATION DAMPER

Filed June 23, 1958

INVENTOR.
WILLIAM J. TROYER.
BY
Lockwood, Galt, Woodard + Smith.
ATTORNEYS.

United States Patent Office 2,948,129
Patented Aug. 9, 1960

2,948,129

ELLIPTICAL VIBRATION DAMPER

William J. Troyer, Martinsville, Ind., assignor to Schwitzer Corporation, Indianapolis, Ind., a corporation Filed June 23, 1958, Ser. No. 743,893

6 Claims. (Cl. 64—11)

This invention relates generally to vibration dampers and in particular to a construction which can be utilized for reducing the torsional vibration of the crankshaft of a reciprocating engine or the like, or for coupling a driving and a driven shaft.

In tuned dampers of the type conventionally used to reduce torsional vibrations in shafts such as reciprocating engine crankshafts, a straight cylindrical or annular elastic element is interposed between a driven inertia member and a driving center member which is mounted for rotation on the shaft. In applying these conventional dampers difficulty has been encountered as a result of permanent relative angular displacement between the driving and driven members. In damper assemblies wherein these elements are held by precompression of the elastic element, this permanent set or displacement has a deleterious effect on the elastic element and renders the damper useless as a means for timing the engine with which it is associated. This shift of the elastic element may also cause unbalance in the assembly. In damper assemblies wherein a bonding agent is used to retain the driving and driven elements in their respective positions, the bond may be broken by large relative angular movement between the driving and driven members and the damper thereby destroyed. Further, because of the stress-strain relationship characteristic of the elastic materials conventionally used, an increase in amplitude of vibration causes a reduction in the force-deflection ratio, or spring rate, of the assembly and complicates the task of obtaining optimum tuning, that is, the optimum ratio of damper frequency to the mass elastic system frequency.

Additionally, there has long been a need for a shaft coupling that will allow for larger angular misalignment of the shafts, provide a torsionally flexible coupling, and have a simple and dependable construction requiring no maintenance. Conventionally, couplings of this type now in use require lubrication and maintenance, are complicated and expensive and do not give the system torsional flexibility.

It is an object of the present invention to provide a torsional vibration damper assembly which prevents permanent relative angular displacement between the driving and driven members, thereby eliminating certain of the shortcomings of conventional damper structures and making possible improved damper performance.

A further object of the present invention is to provide a torsional vibration damper assembly utilizing an elastic element and formed so as to place the element in shear when subjected to small amplitude torsional vibrations and in compression when subject to high amplitude torsional vibrations.

A further object of the present invention is to provide a torsional vibration damper assembly characterized by an elliptical configuration of the surfaces confining the elastic element, whereby the spring rate of the assembly increases with the magnitude of the torsional vibrations imposed thereon.

A further object of the present invention is to provide a vibration damper assembly which is effective to limit both first mode vibrational amplitudes and second mode vibrational amplitudes.

A further object of the present invention is to provide a coupling for joining rotating shafts wherein relatively large angular misalignment of the shaft axes can be tolerated while yet providing a torsionally flexible coupling requiring no maintenance or lubrication.

The full nature of the invention will be understood from the accompanying drawings and the following description and claims:

Figure 1:
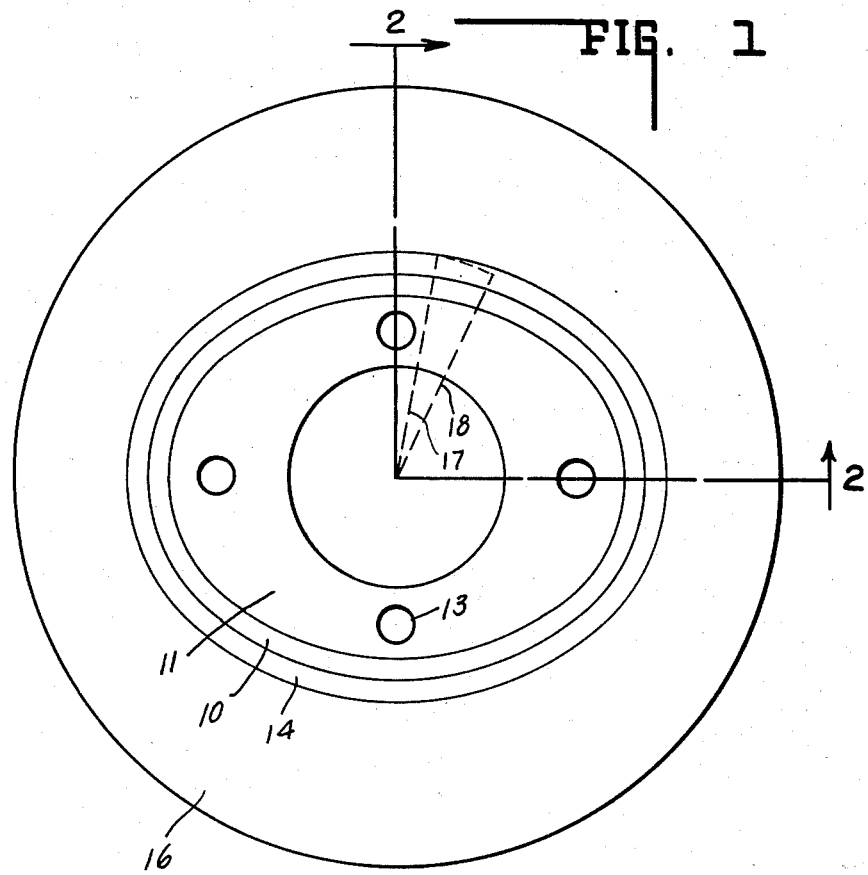
Fig. 1 is an end view of a damper assembly embodying the present invention.
Figure 2:
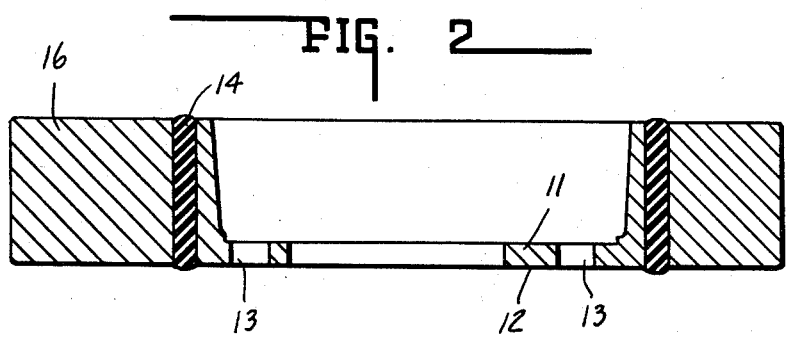
Figure 2 is a side sectional view of the damper assembly taken generally along the lines 2—2 of Fig. 1.

Referring to the drawings, the assembly embodying the present invention comprises a driving member 10 having a generally elliptical cylinder configuration. The driving member is provided with an inwardly-extending mounting flange 11 providing a radial surface 12 which is adapted to be mounted in contiguous relation with a hub, accessory drive pulley, or similar means conventionally operatively associated with the crankshaft of a reciprocating engine. The flange 11 may include a plurality of apertures 13 for receiving bolts for attaching the driving member to the shaft.

An elastic member 14 embraces the outer surface of the driving member and, in turn, supports an outer, driven inertia member 16. The elastic member confined between the driving and driven members may be formed of rubber or a similar elastic composition and may be injected into the space between the driving and driven members either prior to or after curing. The elastic member may be in a state of radial compression in the assembly, and a suitable bonding agent may be applied between the elastic element and the driving and driven members depending upon the mode of manufacture used and the practical operational conditions.

It will be noted that the central aperture in the driven member 16, which accommodates the driving member and the elastic element, has an elliptical configuration which corresponds to the elliptical configuration of the driving member. It should further be noted that the driving and driven members are assembled so that the corresponding major and minor axes of the elliptical aperture and of the driving member lie substantially in the same plane.

In operation with the driving member rotating with a shaft subject to torsional vibration, the driven inertia member will subject the elastic element to both shear stress and compressive stress. For small relative angular deflections of the driven and driving members the elastic element is subjected primarily to shearing stress. For large relative angular deflections the elastic element is placed under compressive stress. This action may be made clear by reference to broken lines 17 and 18 in Fig. 1, it being understod that the magnitude of the distances illustrated is exaggerated for the sake of clarity. Should a reference point on the margin of the elliptical aperture formed in the driven member 16 be displaced from a position vertically above the aperture center to a position defined by the line 17, the elastic element, during this movement, is stressed primarily in shear. Upon the occurrence of higher amplitude vibrations, displacing the reference point to a position defined by the line 18, it will be evident that the elastic element is placed primarily under compressive stress in the upper right-hand quadrant and in the diametrically opposite quadrant. In the adjacent quadrants the elastic element will be placed under tensile stress, assuming the element is bonded to rather than precompressed between the driving and driven members. The actual magnitude of the normal deflections between the driving and driven members, however, are so small that the tensile stress thereby placed on the elastic element remains well within its ultimate strength.

It is characteristic of a restrained elastic element of the type herein referred to that it is flexible or soft when subjected to shearing stress, but is relatively inflexible or stiff when placed under compressive stress. The shift in the type of stress imposed upon the elastic element, as described above, results in an automatic increase in the spring rate of the damper assembly as the amplitude of the torsional vibrations to which it is subjected increases. Thus, by the proper selection of the amount of eccentricity of the elliptical surfaces on the driving and driven members for a given installation, a desirable shift in spring rate of the assembly can be obtained.

In the application of a vibration damper of the type conventionally used to a typical mass elastic system, such as an automotive engine, two modes of vibration of the critical orders are normally encountered. Damper assemblies having frequencies below the optimum are effective in damping first mode amplitudes, but allow second mode amplitudes to become excessive. Damper assemblies having natural frequencies above the optimum are effective in damping second mode amplitudes but allow excessive first mode vibrations. In conventional design of tuned vibration dampers, the natural frequency is selected in such a manner that it limits the amplitudes of each of these modes to approximately equal values.

Utilizing the damper structure of the present invention, the damper may be designed with a lower natural frequency than would be used with its conventional counterpart having a circular configuration. Thus, for small relative angular displacement between the driving and driven members, the low natural frequency drastically reduces the first mode vibration amplitudes. The second mode vibration amplitudes, which occur at higher speed are prevented from becoming excessive by the change in spring rate, or stiffening of the assembly caused by the elliptical design. Since the higher spring rates are more effective in damping second mode vibrations, the amplitudes of the second mode vibrations are thus controlled without corresponding loss of the control of the first mode vibration amplitudes. The speed at which the second mode vibrational amplitudes occurs is also desirably increased due to the effect of this higher damper frequency on the tuning of the mass elastic system.

It will be noted that the basic design described might also be used as a coupling to isolate vibrations between the two shafts. Assuming that the source of torsional vibrations is an internal combustion engine driving one of the coupled shafts, the coupling assemblies would, in this type of application, be designed so that the resonant frequency of the coupling is below that of the lowest significant firing frequency of the reciprocating engine at low idle condition. This would be in contrast to the use of the assembly as a vibration damper wherein its resonant frequency is tuned to a certain percent of the resonant frequency of the mass elastic system.

Figure 3:
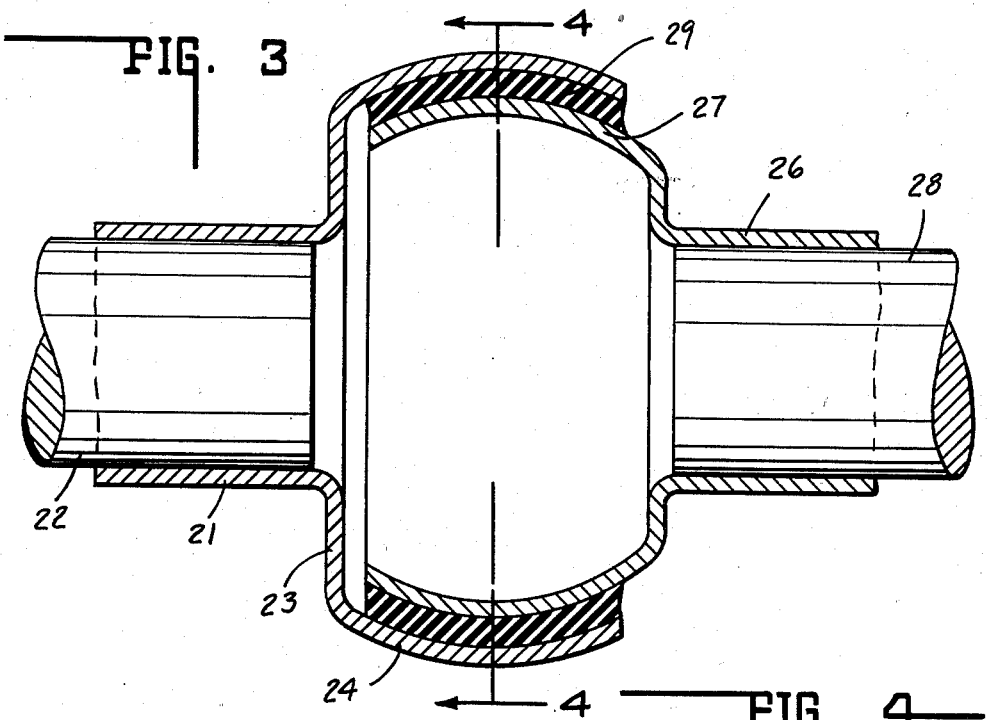
Fig. 3 is a side sectional view of a coupling embodying the present invention.
Figure 4:
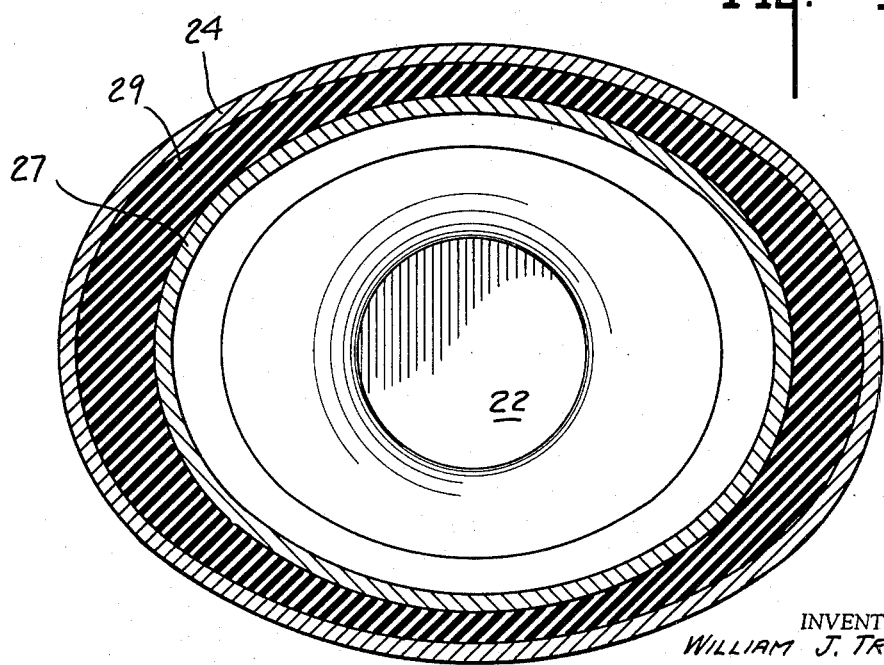
Fig. 4 is a sectional view taken generally along the line 4—4 of Fig. 3.

Figs. 3 and 4 illustrate an embodiment of the present invention which is utilized as a coupling between driving and driven shafts which would normally have some misalignment. The driven member consists of an extending sleeve 21 adapted to be concentrically attached to a driving shaft 22. The sleeve is provided with a radially extending portion 23 terminating in an axially extending rim portion 24. A similarly formed driven element includes a sleeve 26 and a rim portion 27. The sleeve 26 is adapted for concentric attachment to a driven shaft 28. The rim portions of the driving and driven members are spaced from each other by an elastic element 29, the elastic element being held in place by a surface bond with the rims or by precompression of the elastic member. As shown in Figs. 3 and 4, the driving and driven members are formed from sheet metal, however, it will be evident that they might also be readily formed by casting, forging or machining. While the outer member is herein described as the driving member and the inner member as the driven member, it will be apparent that this relationship might be reversed without altering the operation of the coupling.

As will be evident particularly from Fig. 4, the rim portions of the driving and driven members are elliptical in form in a plane perpendicular to the axis of the driving shaft. As may best be seen in Fig. 3, the rim portions are formed as segments of concentric circles when viewed in section in a plane parallel to and intersecting the axis of the driving shaft. This provides the area of the rim portions which are contiguous to the elastic element with a configuration which is substantially that of a segment of an elliptical spheroid.

In operation, torque applied to the driving member by the shaft 22 is transmitted through the elastic element to the driven member and to the driven shaft. Small amounts of torque applied to the driving member cause a small relative angular movement between the driving and driven members in a plane perpendicular to the shaft axes. Keeping in mind the description of the operation of the vibration damping embodiment of the present invention, it will be evident that with these small angular deflections, the elastic element will be stressed only in shear.

A relatively large amount of torque applied to the driving element causes a larger relative angular movement between the driving and driven members, and, due to the elliptical design, causes portions of the elastic element to be placed under compressive stress, thus increasing the torsional spring rate. The design herein described thus provides a low spring rate for small torsional deflections and an increasing spring rate as the relative deflection increases. In addition to this desirable variation in the torsional spring rate, the maximum load carrying capacity of the coupling is much greater than would be the case if the driving and driven members were circular rather than elliptical in form. This increase in load carrying capacity is due to the higher ultimate strength of a restrained elastic element under compression.

In planes parallel to and intersecting the drive shaft axis, the curvature of the rim portion varies with the radius in such a manner that the inner surface of the rim portion 24 and the outer surface of the rim portion 27 appear as concentric circles having their mutual center at the point of intersection of the axes of the driving and driven shafts. Axial deflection of the shafts with relation to each other thus causes the application of primarily a shearing stress on the elastic element.

As shown in Figs. 3 and 4, the coupling is formed so that the eccentricity of the two rim portions varies in such a manner that the device will have the same spring constant for all directions of angular misalignment of the driving and driven axes. The spring rate (K) varies approximately in accordance with the formula $$K = \frac{C \Pi G L R_m^3}{R'}$$

in which C is a constant, having a finite value depending upon the proportions of the elastic element, G is the dynamic shear modulus of the elastic material, L is the axial length of the elastic element, $R_m$ is the mean radius of the elastic element and $R'$ is the radial wall thickness of the elastic element. From the formula it will be evident that the radial wall thickness of the elastic element must vary according to the cube of the mean radius of the elastic element in order to obtain the same spring rate in all directions of angular movement between the driving and driven axes. This particular form of the design is desirable from the standpoint of attaining equal bearing load, however, it will be evident that the elastic element need not be so proportioned where added strength of the coupling or where the increasing spring rate for torsional deflections are paramount considerations.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A coupling assembly for joining axially aligned driving and driven shafts, said assembly including a driving member adapted for mounting in concentric relation to the driving shaft for rotation therewith, said driving member being formed to provide a concave surface having an elliptical configuration in a plane normal to the axes of said shafts, a driven member adapted for mounting in concentric relation to the driven shaft for rotation therewith, said driven member being formed to provide a convex surface having an elliptical configuration in a plane normal to the axes of said shafts, said driving and driven members being positioned with relation to each other so that the major and minor axes of said concave and convex surfaces lie in the same plane, and an elastic element interposed between said concave and convex surfaces having a radial thickness varying with its mean radius, whereby upon the application of relatively low magnitude torque to said driving member said elastic element is subjected primarily to shear stress and upon the applicatiton of higher magnitude torque said elastic element is subjected primarily to compressive stress.

2. A coupling assembly for joining axially aligned driving and driven shafts, said assembly including driving and driven members adapted for mounting in concentric relation respectively to the driving and driven shafts for rotation therewith, one of said members being formed to provide a concave surface having an elliptical configuration in a plane normal to the axes of said shafts, the other of said members being formed to provide a convex surface having an elliptical configuration in a plane normal to the axes of said shafts, said driving and driven members being positioned with relation to each other so that the major and minor axes of said concave and convex surfaces lie in the same plane, and an elastic element interposed between said concave and convex surfaces having a radial thickness varying with its mean radius, whereby upon the application of relatively low magnitude torque to said driving member said elastic element is subjected primarily to shear stress and upon the application of higher magnitude torque said elastic element is subjected primarily to compressive stress.

3. A coupling assembly for joining driving and driven shafts, said assembly including a driving member adapted for mounting in concentric relation to the driving shaft for rotation therewith, said driving member being formed to provide a concave surface having an elliptical configuration in a plane normal to the axis of said driving shaft and having a circular configuration in a plane parallel to and intersecting the driving shaft, a driven member adapted for mounting in concentric relation to the driven shaft for rotation therewith, said driven member being formed to provide a convex surface having an elliptical configuration in a plane normal to the axis of said driven shaft and having a circular configuration in a plane parallel to and intersecting the driven shaft, said driving and driven members being positioned with relation to each other so that the major and minor axes of said concave and convex surfaces lie in the same plane and an elastic element interposed between said concave and convex surfaces having a radial thickness varying with its mean radius, whereby upon the application of relatively low magnitude torque to said driving member said elastic element is subjected primarily to shear stress and upon the application of higher magnitude torque said elastic element is subjected primarily to compressive stress, angular misalignment of said shafts providing only a shearing stress on said elastic element.

4. A coupling assembly for joining driving and driven shafts, said assembly including a driving and driven member adapted for mounting in concentric relation respectively to the driving and driven shafts for rotation therewith, one of said members being formed to provide a concave surface having an elliptical configuration in a plane normal to the axis of said driving shaft and having a circular configuration in a plane parallel to and intersecting the driving shaft, the other of said members being formed to provide a convex surface having an elliptical configuration in a plane normal to the axis of said driven shaft and having a circular configuration in a plane parallel to and intersecting the driven shaft, said driving and driven members being positioned with relation to each other so that the major and minor axes of said concave and convex surfaces lie in the same plane, and an elastic element interposed between said concave and convex surfaces having a radial thickness varying with its mean radius, whereby upon the application of relatively low magnitude torque to said driving member said elastic element is subjected primarily to shear stress and upon the application of higher magnitude torque said elastic element is subjected primarily to compressive stress, angular misalignment of said shafts providing only a shearing stress on said elastic element.

5. A rotatable assembly including concentrically mounted driving and driven members, one of said members being formed to provide a concave surface having an elliptical configuration in a plane normal to the axis of rotation of said assembly, the other of said members being formed to provide a convex surface having an elliptical configuration in a plane normal to the axis of rotation of said assembly, said driving and driven members being positioned with relation to each other so that the major and minor axes of said concave and convex surfaces lies in the same plane, and an elastic element interposed between said concave and convex surfaces having a radial thickness varying with its mean radius, whereby upon small angular displacement of said members relative to each other said elastic element is subjected primarily to shear stress and upon large angular displacement of said members said elastic element is subjected primarily to compressive stress.

6. A rotatable assembly including concentrically mounted driving and driven members, one of said members being formed to provide a concave surface in a plane normal to the axis of rotation of said assembly, the other of said members being formed to provide a convex surface in a plane normal to the axis of rotation of said assembly, said driving and driven members being positioned with relation to each other so that said concave and convex surfaces are generally parallel, and an elastic element interposed between said concave and convex surfaces having a radial thickness varying with its mean radius, said surfaces having a configuration such that upon small angular displacement of said members relative to each other said elastic element is subjected primarily to shear stress and upon large angular displacement of said members said elastic element is subjected primarily to compressive stress.

References Cited in the file of this patent

UNITED STATES PATENTS

| | | |
|---|---|---|
| 2,039,378 | Anderson | May 5, 1936 |
| 2,312,470 | Julien | Mar. 2, 1943 |
| 2,363,469 | Goldschmidt | Nov. 21, 1944 |